Feb. 16, 1954 — A. C. THOMSON — 2,669,308
CONTROL SYSTEM FOR COAXIAL HELICOPTER BLADES
Filed Aug. 3, 1950 — 5 Sheets-Sheet 1

Inventor
Alan C. Thomson
By
Attorney

Feb. 16, 1954     A. C. THOMSON     2,669,308
CONTROL SYSTEM FOR COAXIAL HELICOPTER BLADES
Filed Aug. 3, 1950     5 Sheets-Sheet 2

Inventor
Alan C. Thomson

Attorney

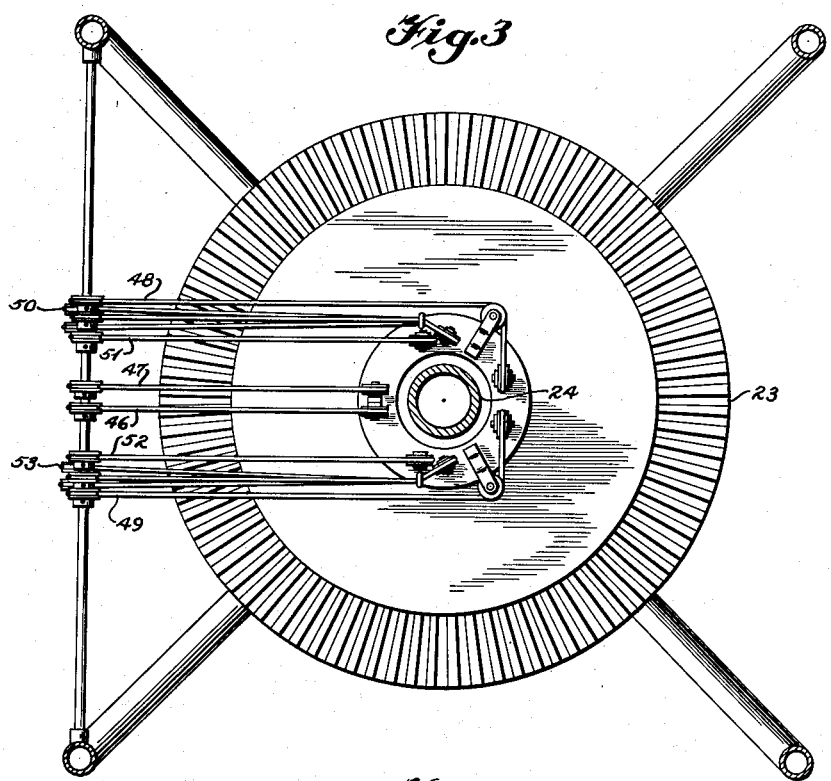
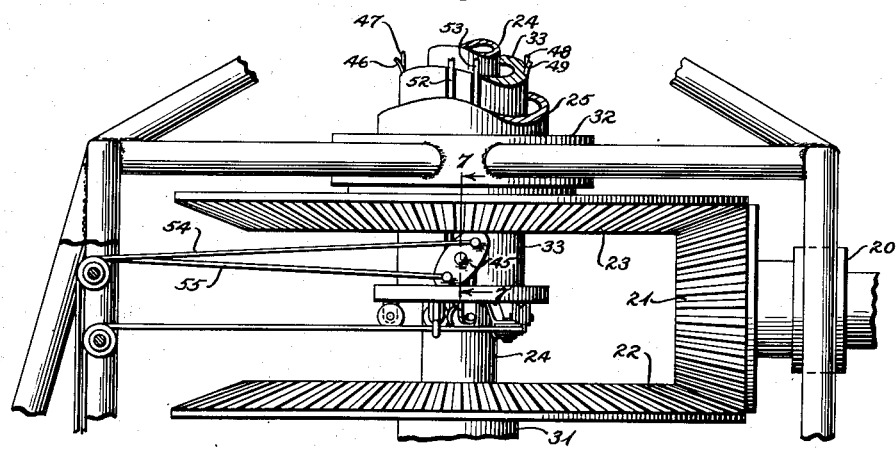

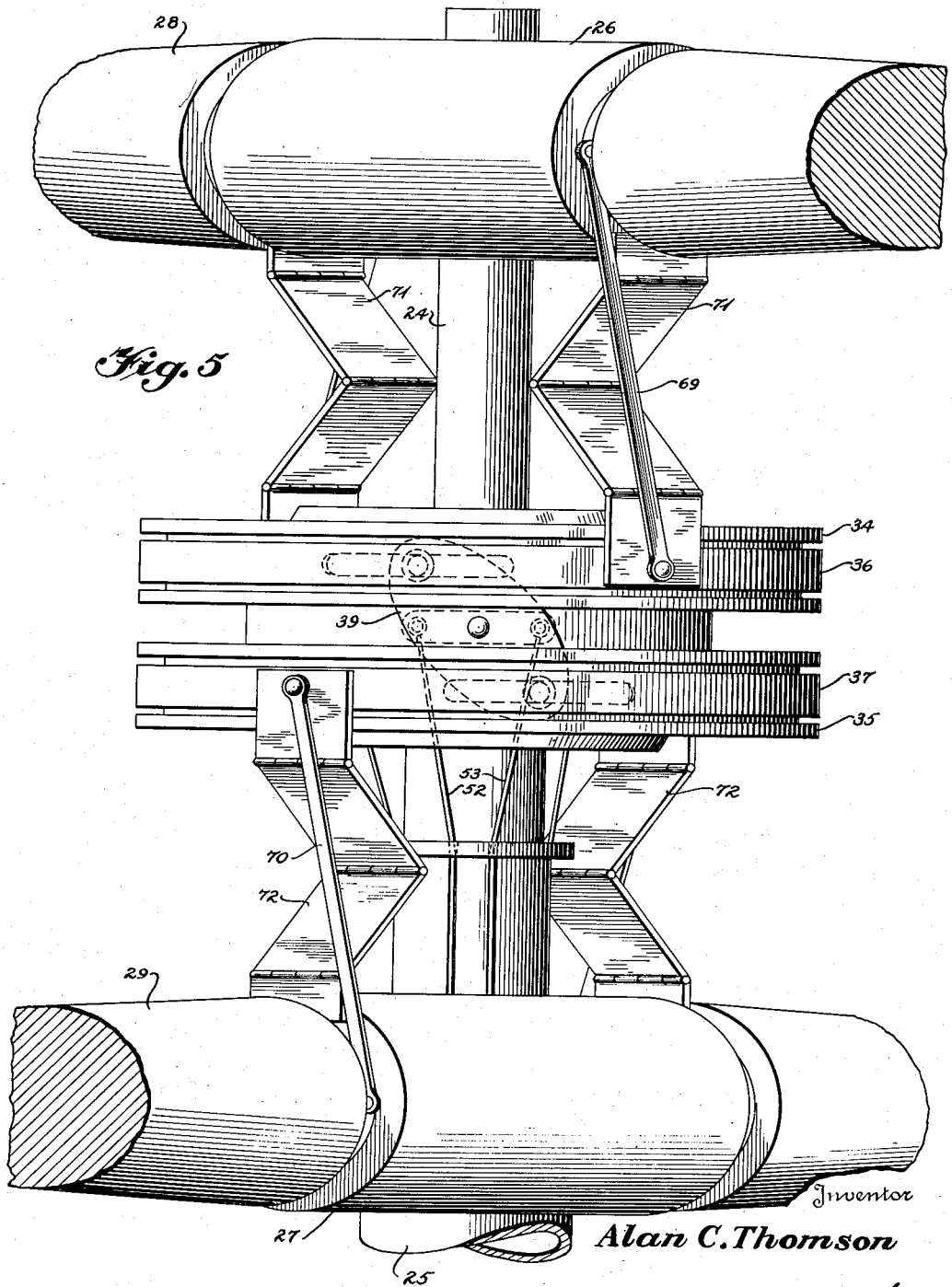

Feb. 16, 1954                A. C. THOMSON                2,669,308
           CONTROL SYSTEM FOR COAXIAL HELICOPTER BLADES
Filed Aug. 3, 1950
                                              5 Sheets-Sheet 5
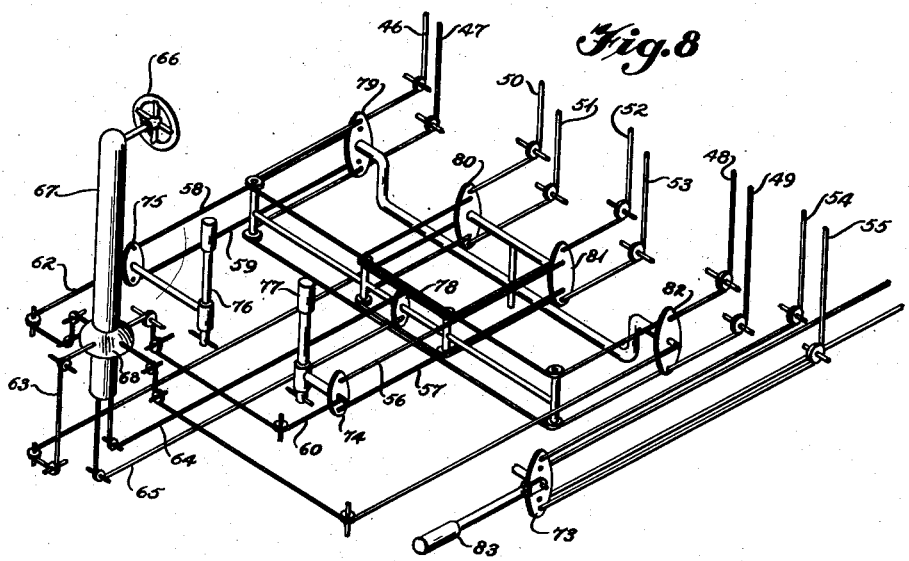
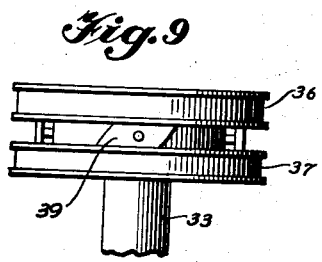
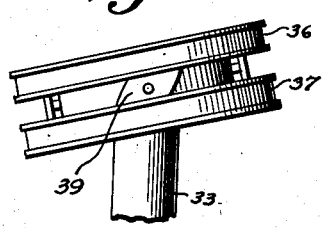
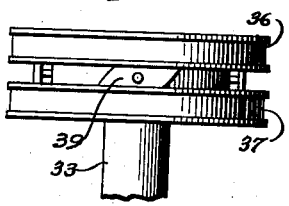
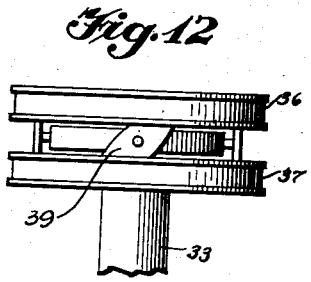
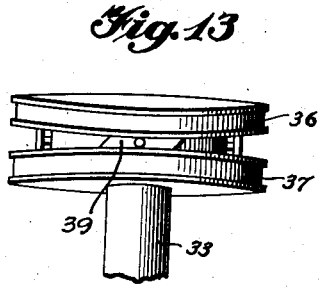
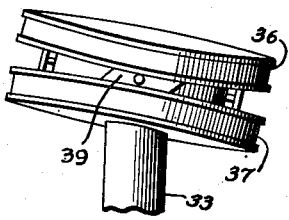
Inventor
Alan C. Thomson
By
Attorney Patented Feb. 16, 1954

2,669,308

UNITED STATES PATENT OFFICE 2,669,308

CONTROL SYSTEM FOR COAXIAL HELICOPTER BLADES

Alan C. Thomson, Manhattan Beach, Calif.

Application August 3, 1950, Serial No. 177,545

2 Claims. (Cl. 170—135.24)

(Granted under Title 35, U. S. Code (1952), sec. 266)

The present invention relates to a rotary wing aircraft of the coaxial rotor type and more particularly to a control system for the blades of a coaxial type craft having means for controlling acceleration, deceleration, vertical movement, and turning movement of the craft.

Rotary wing aircraft of the coaxial type generally comprise a pair of coaxial contra-rotating screws having a plurality of blades thereon and means for varying the pitch of the blades to thereby effect directional control of the craft. This type of craft entirely eliminates the torque control propeller and its supporting structure, found at the rear of all conventional single rotored helicopters, and makes all of the power delivered by the engine, except for transmission losses, available for thrust.

An object of the present invention is the provision of a control system for a rotary wing aircraft of the coaxial type which permits acceleration and deceleration while keeping the fuselage of the craft on an even plane.

Another object is to provide a novel control system for a coaxial type rotary wing aircraft whereby the normal maneuvers of a conventional aircraft may be obtained.

A further object of the invention is the provision of a control system for a coaxial type rotary wing aircraft having means for regulating the engine in accordance with the requirements of the rotors.

Still another object is to provide a control system for a coaxial type rotary wing aircraft whereby any desired directional movement of the craft may be simply and effectively obtained with a minimum of operational control.

All of the foregoing, and still further objects and advantages of the invention will become apparent from a study of the following specification, taken in connection with the accompanying drawings wherein like reference characters designate corresponding parts throughout the several views, and wherein:

Fig. 3 is a section of the device taken along the line 3—3 of Fig. 2, illustrating the mounting of the control cables and the pulleys therefor.

Fig. 4 is an enlarged side view, partly in section, of the transmission of Fig. 1 illustrating the control cables and the vertical movement cam of the present invention.

Fig. 5 is an enlarged side elevation of the control head arrangement of Figs. 1 and 2, illustrating the connections between the control rings and the blades of the rotor.

Fig. 8 is a perspective view of the general arrangement of the control system of the present invention illustrating the steering column and the control cables.

Figs. 9 to 14 are side elevations of various positions of the control head. For clarity, the connecting rods to the blades and the drive shafts have been omitted from these views.

Figure 1:
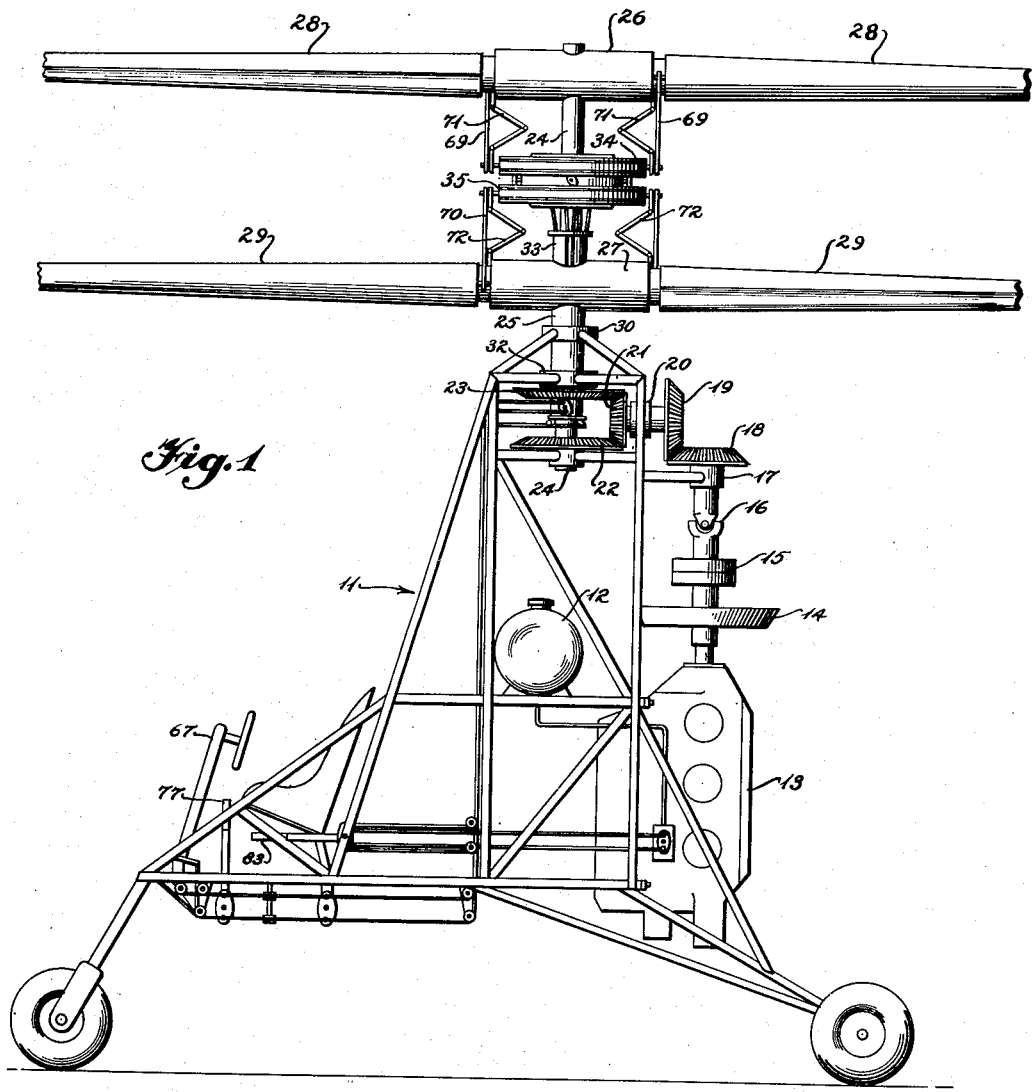
Fig. 1 is a side elevation of a helicopter illustrating the general arrangement of parts of the present invention.

Referring now to the drawings, there is shown in Fig. 1, which illustrates a preferred embodiment, a fuselage 11 of suitable construction supported by landing wheels, not designated which may be supplanted by floats or any other desired form of landing gear.

An engine 13 is mounted preferably at the rear of fuselage 11 and in vertical position to facilitate servicing and removal, while a seat, not designated, is mounted on the forward portion of fuselage 11. Fuel tanks 12 are mounted as near the center of gravity of the structure as possible in order to minimize the trimming necessary as the fuel is consumed.

Engine 13 is connected by a splined shaft to a clutch 14 into which is built any suitable cooling system, not shown, for the engine, clutch 14 being connected to a free wheeling device 15. Device 15 permits rotation of the blades of the rotor independently of engine 13 since device 15 engages only when the speed of the engine shaft exceeds that of the shaft on the upper side of device 15. Connected to device 15 is a universal coupling 16 which may be any type suitable for permitting slight disalignment, the upper end of coupling 16 being journaled in a bearing 17 mounted on the frame of fuselage 11.

Attached to the upper end of the universal coupling 16 is a gear 18 meshing with another gear 19 of suitable reduction and at right angles thereto. Gear 19 is connected to one end of a shaft, not designated, which is supported by a bearing 20 in the frame of fuselage 11, the other end of the shaft carrying a pinion gear 21, which engages bevel gears 22 and 23. By locating bevel gears 22 and 23 below and above pinion 21, respectively, gears 22 and 23 rotate in opposite directions and at equal speeds.

Lower gear 22 is directly connected to drive shaft 24 supported in the frame of fuselage 11 by bearing 31 and connected at its upper end to upper hub 26 and upper blades 28 of the upper rotor. Similarly upper gear 23 is directly connected to outer drive shaft 25 supported in the frame of fuselage 11 by bearings 30 and 32 and connected at its upper extremity to hub 27 and blades 29 of the lower rotor. Thus, it can readily be seen that blades 28 and 29 rotate in opposite directions and at equal speeds at all times regardless of whether or not engine 13 is engaged thus permitting power off descent.

Figure 2:
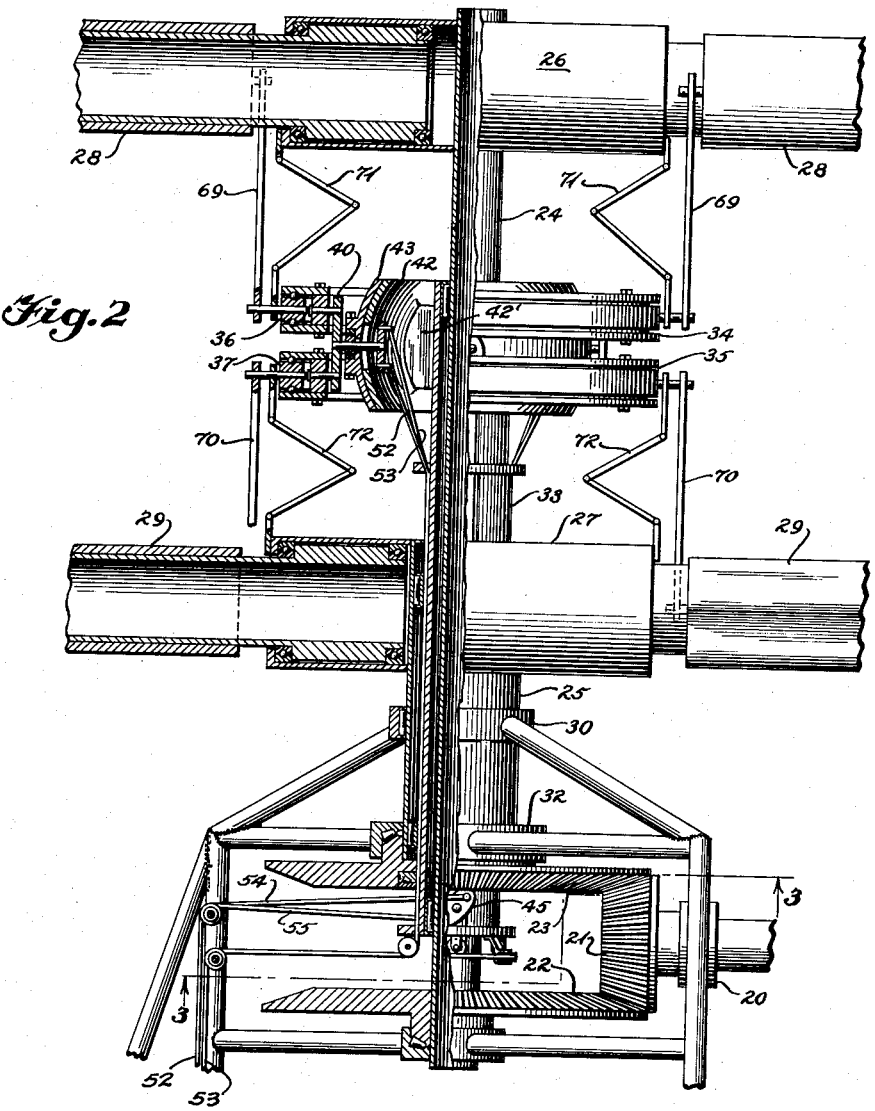
Fig. 2 illustrates an enlarged view, partly in section, of the drive connection and control head arrangement of Fig. 1. The front section is cut away giving a clearer view of the control head.
Figure 7:
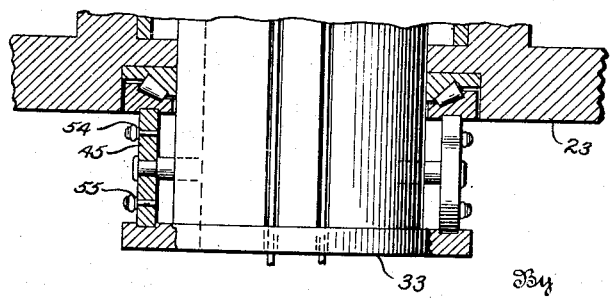
Fig. 7 is a section taken along the line 7—7 of Fig. 4 looking in the direction of the arrows, and illustrating the cam and the rotor shaft mountings.

Positioned between inner drive shaft and outer drive shaft 25 is a shaft 33 which is flanged at its lower end, as shown in Figs. 2 and 4, and supports control rings 34 and 35 at its upper end. Shaft 33 is supported by suitable resilient means of a type selected from those known in the art. This support for the rings may be obtained in several ways one of which is illustrated in Figs. 2 and 5. Figs. 2 and 5 disclose a truncated ball 42 connected by brackets 42' to shaft 33, and a truncated hollow sphere or socket 43 is disposed on the outer surface of ball 42. This ball and socket arrangement permits tilting of rings 34 and 35 at any angle but still maintains the rings in parallel planes.

Figure 6:
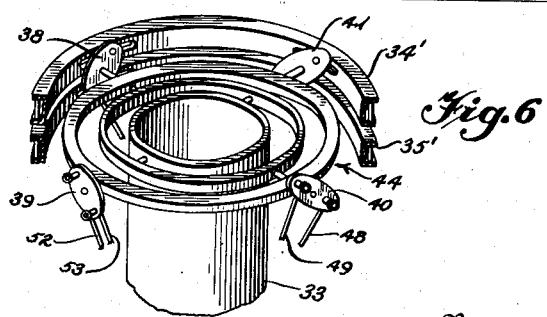
Fig. 6 illustrates a side elevation of a modification of the control head, the forward portion thereof being cut away to show the cam structure.

An alternative means for supporting rings 34' and 35' is illustrated in Fig. 6 wherein is shown a gimbal ring arrangement 44 comprising an inner and outer gimbal ring pivoted about perpendicularly related axes. Tilting of rings 34' and 35' is accomplished by either or both gimbal rings pivoting about their axes.

Referring back to Fig. 2, inside rings 34 and 35, which do not rotate, are two rotating rings 36 and 37 which are supported by bearings, not designated, and to which are connected the leading edge of blades 28 and 29 by connecting rods 69 and 70, respectively. Extending from hubs 26 and 27 to the rotating rings 36 and 37, respectively, are flexible drive arms 71 and 72, respectively, each of which constitutes a drive connection. Flexible arms 71 and 72, which are driven by hubs 26 and 27, rotate rings 36 and 37 and keep the base of rods 69 and 70 directly in line with the center line of blades 28 and 29, arms 71 and 72 being so hinged as to permit flexing only in a vertical plane. Thus the pitch of the blades throughout their cycle is determined by the attitude of their respective rings.

It is, therefore, apparent that as socket 43 is tilted in any direction, rings 34 and 35 will follow the angle of the socket thereby effecting the angle of incidence of each blade as it rotates. Any number of combinations may result, governing all conditions of flight in a manner to be described below.

Referring now to Fig. 8, wherein is disclosed the components of the control system of the present invention, there is a total pitch lever 83 located preferably to the left of the operator's seat and connected to the engine throttle control in any suitable manner, lever 83 governing the vertical movement of the craft by altering the pitch of all blades 28 and 29 in the same direction and magnitude.

As lever 83 is pushed down connection 73 is pivoted and cable 54 is tightened drawing it in a predetermined distance, cable 55 being released the same distance. Cables 54 and 55 run through a series of pulleys to cam 45 positioned at the base of shaft 33 having its lower end resting on the flange of the shaft (see Fig. 4). Since cable 54 is tightened and cable 55 released, cam 45 is pulled to a more nearly vertical position and forces shaft 33 and the ring assembly downward thereby forcing the leading edges of all blades downward to decrease the angle of attack and lower the craft.

If the lever 83 were raised, the opposite results would obtain, the blades increasing their pitch and causing the craft to rise. By connecting lever 83 to the throttle the operator of the craft is relieved of an extra control, since raising or lowering the lever will increase or decrease the lift and drag thereby requiring more or less power from the engine.

Referring now to Fig. 9, there is shown the position of the control rings in neutral position resulting in normal hovering of the craft, the control rings being parallel and a given distance apart. Vertical ascent or descent is governed by up and down movement of the entire ring assembly and supporting column by means of cam 45 and lever 83 as explained above.

Forward, rearward and sideward directional flight is controlled by means of angular movement of steering column 67, operated by steering wheel 66. Thus, if forward directional flight is desired, steering wheel 66 is pushed forward inclining column 67 forward thereby putting tension on cable 60 connected to column 67 as shown in Fig. 8. The tension on cable 60 pulls connection 81 and cables 52 and 53, and releases connection 80 and cables 50 and 51.

Cables 52 and 53 are run through guides on shaft 33 and connected to ring cam 39 at the front of the ring assembly on the upper end of shaft 33. Similarly cables 46 and 47, 48 and 49, and 50 and 51 are run through guides to cams 38, 40 and 41, respectively, as shown in Fig. 6.

Therefore, release of cables 50 and 51 and tension in cables 52 and 53 tilts both rings 34 and 35 forward but maintaining them parallel as shown in Fig. 10. This increases the pitch of the blades 28 and 29 as they pass the rear portion of the craft and decreases the pitch in the forward portion thereof thereby imparting a horizontal vector to the thrust resulting in forward motion. Rearward motion is obtained by moving column 67 rearward to tension cable 63, while sideward motion may be obtained by movement of column 67 in the desired direction thereby effecting cables 61 and 62.

By turning steering wheel 66, cables 64 and 65 in support 68 rotate connection 78 which in turn rotates connections 79, 80, 81, 82 alternatively lengthening and shortening cables 46 and 47, 50, 51, 52 and 53, and 48 and 49, resulting in positions of the rings 34 and 35 as shown in Figs. 11 and 12, depending upon which direction the wheel is turned. Fig. 11 illustrates the rings as being parallel and close together for a left turn, while Fig. 12 illustrates the rings as being parallel and extended for a right turn. This changes the pitch of one set of blades in relation to that of the other set, imparting a turning moment by the resulting torque without affecting the total pitch of the blades.

Referring again to Fig. 8, additional means are provided for governing directional motion of the craft without altering the horizontal position of the fuselage, this being accomplished by what may be termed "paddling." For starting or acceleration, this is in effect the feathering of the advancing blade and increasing the pitch of the retreating blade which forces a certain amount of air rearward on each side of the craft thus accelerating the craft. In deceleration, the advancing blades are increased in pitch and the retreating blades are feathered thereby producing the opposite result.

By pushing lever 76 forward, connection 75 and cables 58 and 59 turn connections 79 and 82 oppositely thereby lengthening cables 47 and 48 and shortening cables 46 and 49. This action causes movement of cams 38 and 40 resulting in a ring position as shown in Fig. 13 thereby achieving forward flight without changing the horizontal position of the fuselage. Similarly, lever 77 controls sideward paddling by means of cables 56 and 57 and connections 74, 80 and 81.

By this arrangement, a normal nose up climb similar to that in conventional stationary wing aircraft may be obtained by pushing forward on lever 76 which forces the air rearward causing forward flight, and pulling back on control column 67 which increases the pitch of the blades causing a lifting of the nose. The position of the rings under these conditions is illustrated in Fig. 14.

Obviously many modifications and variations of the present invention are possible in the light of the above teachings. It is, therefore, to be understood that, within the scope of the appended claims, the invention may be practiced otherwise than as specifically described.

The invention described herein may be manufactured and used by or for the Government of the United States of America for governmental purposes without the payment of any royalties thereon or therefor.

What is claimed is:
1. In a rotary wing aircraft, a pair of coaxial contra-rotatable shafts, a set of blades for each of said shafts, an intermediate shaft rotatably and slidably supported between said coaxial contra-rotatable shafts, a control head connected to said intermediate shaft and including a pair of spaced, movably mounted ring support members, a control ring rotatably mounted in each ring support, means connecting said rings and said sets of blades, respectively, means connected with said intermediate shaft for reciprocating said intermediate shaft and said head to change the total pitch of the blades of both of said sets in the same manner, and means forming a part of said head and operatively connected to said ring supporting members for tilting said head to change the cyclic pitch of the blades of both sets in the same manner, and for altering the spacing between said members to change the pitch of one set of blades with respect to the other.

2. The combination of claim 1 and the last mentioned means therein including a plurality of cam surfaces in said ring supporting members together with cams operable thereon.

ALAN C. THOMSON.

References Cited in the file of this patent
UNITED STATES PATENTS

| Number | Name | Date |
|---|---|---|
| 2,318,260 | Sikorsky | May 4, 1943 |
| 2,410,533 | Thomson | Nov. 5, 1946 |
| 2,435,080 | Hoover | Jan. 27, 1948 |
| 2,473,331 | Donley | June 14, 1949 |
| 2,486,059 | Pentecost | Oct. 25, 1949 |
| 2,505,759 | Faulkner | May 2, 1950 |